US012761635B2

(12) United States Patent
Yang et al.

(10) Patent No.: US 12,761,635 B2
(45) Date of Patent: Oct. 13, 2026

(54) MANUFACTURING CONTROL METHOD AND NON-TRANSITORY COMPUTER READABLE MEDIA

(71) Applicant: UNITED MICROELECTRONICS CORP., Hsinchu (TW)

(72) Inventors: Yung-Yu Yang, Tainan City (TW); Chih-Kuan Chang, Tainan City (TW); Chung-Chih Hung, Kaohsiung City (TW); Yu-Hsien Tsai, Tainan City (TW); Chen-Hui Huang, Hsinchu City (TW)

(73) Assignee: UNITED MICROELECTRONICS CORP, Hsinchu (TW)

( * ) Notice: Subject to any disclaimer, the term of this patent is extended or adjusted under 35 U.S.C. 154(b) by 504 days.

(21) Appl. No.: 18/237,640

(22) Filed: Aug. 24, 2023

(65) Prior Publication Data

US 2025/0053161 A1 Feb. 13, 2025

(30) Foreign Application Priority Data

Aug. 9, 2023 (TW) ................................ 112129944

(51) Int. Cl.
*G05B 19/418* (2006.01)

(52) U.S. Cl.
CPC .................. *G05B 19/41875* (2013.01); *G05B 2219/32368* (2013.01)

(58) Field of Classification Search
CPC ................ G05B 19/41875; G05B 2219/32368
See application file for complete search history.

(56) References Cited

U.S. PATENT DOCUMENTS

2022/0171663 A1* 6/2022 Hiregoudar ........... G06F 3/0631

OTHER PUBLICATIONS

J. Talonen and M. Sirola, "Generated control limits as a basis of operator-friendly process monitoring," 2009 IEEE International Workshop on Intelligent Data Acquisition and Advanced Computing Systems: Technology and Applications, Rende, Italy, 2009, pp. 468-472, doi: 10.1109/IDAACS.2009.5342939. (Year: 2009).*
S.-T. Liu, S.-J. Lin and Y.-M. Chen, "Combining density-based clustering and wavelet methods for internal systems anomaly detection," 2011 13th Asia-Pacific Network Operations and Management Symposium, Taipei, Taiwan, 2011, pp. 1-8, doi: 10.1109/APNOMS.2011.6077031. (Year: 2011).*

(Continued)

*Primary Examiner* — Mohammad Ali
(74) *Attorney, Agent, or Firm* — WPAT, PC

(57) ABSTRACT

A manufacturing control method is applied to a computer system comprising a processor, a storage device, and a display device. The manufacturing control method includes: dividing a plurality of outlier-filtered data into a plurality of data subgroups based on a group division reference value; calculating a plurality of standard deviations for each of these data subgroups; calculating a warning line upper limit and a warning line lower limit based on the group division reference value, a predetermined multiple, and the standard deviations; adjusting either the warning line upper limit or the warning line lower limit based on the predetermined multiple and the standard deviations; and when a sensing data exceeds the warning line upper limit or the warning line lower limit, the computing system triggers a warning signal.

10 Claims, 7 Drawing Sheets

(56) References Cited

OTHER PUBLICATIONS

V. Agrawal, B. K. Panigrahi and P. M. V. Subbarao, "Increasing Reliability of Fault Detection Systems for Industrial Applications," in IEEE Intelligent Systems, vol. 33, No. 3, pp. 28-39, May/Jun. 2018, doi: 10.1109/MIS.2018.111144303. (Year: 2018).*

* cited by examiner

MANUFACTURING CONTROL METHOD AND NON-TRANSITORY COMPUTER READABLE MEDIA

CROSS-REFERENCE TO RELATED ART

This application claims the benefit of Taiwan application Serial No. 112129944, filed Aug. 9, 2023, the disclosure of which is incorporated by reference herein in its entirety.

TECHNICAL FIELD

The disclosure relates in general to a manufacturing control method and a non-transitory computer readable media and more particularly to a control chart warning line generation method for a computer system and a non-transitory computer readable media.

BACKGROUND

Fault Detection Classification (FDC) is used to monitor and analyze defects in products or systems during the manufacturing process. FDC is a Statistical Manufacturing control (SPC) technique used to detect anomalies and defects during manufacturing.

Statistical process management is a method of quality management. SPC uses control chart statistical methods to monitor and manage relevant processes to ensure efficient operation, produce more products that meet specifications, and reduce waste (rework or scrapping). Statistical process management can be applied to any process that can measure the output of "qualified products" (products that meet specifications).

The Warning Line of the FDC control chart is a reference line set on the control chart, used to indicate whether observed values in the process tend to be abnormal. Warning lines are usually used to provide early warning signals, alerting operators to changes in the process.

The position of the warning line is typically near the center line (mean line) of the control chart and corresponds to the Control Limits. Control limits on the control chart are used to define the normal range of process variation, while the warning line is used to provide early warnings of potential anomalies.

When observed values on the control chart exceed the warning line but are within the control limits, this indicates that the process is approaching control boundaries and may have some potential issues. The purpose of the warning line is to prompt operators to further investigate and take necessary measures to prevent process boundary violations. The setting of the warning line is typically based on statistical analysis or past experience and knowledge. The position and triggering criteria of the warning line can be customized according to the organization's needs and goals.

The Warning Line of the FDC control chart is a reference line used to provide early warning signals, indicating whether observed values in the process are approaching control boundaries. The Warning Line of the FDC control chart helps to identify potential anomalies during process operation to take appropriate control measures.

FDC typically involves collecting and monitoring process data, such as sensor readings, process variables, or other key parameters. This data can be used to establish models or control charts to detect and classify anomaly or defect events.

The goal of FDC is to detect and classify defects in the process early, to take appropriate control measures to prevent or reduce the production of defective products. Typically, the FDC method is based on statistical characteristics of the data, such as mean, variance, trends, etc., to detect the presence of anomalies.

FDC techniques are widely applied in the manufacturing and industrial sectors, especially in industries with high quality and efficiency requirements, such as semiconductor manufacturing, electronics manufacturing, and chemical production. It helps to improve the stability and consistency of the production process, reduce defect rates, and improve product quality.

However, there are some features and limitations of the current defect detection classification control chart that need to be improved.

First, the warning line in the FDC control chart is contracted based on SPC, meaning it is not based on statistical analysis. In other words, this control line is not calculated based on statistical characteristics of the data. FIG. 1A (prior art) shows the warning line of the FDC control chart obtained by contracting based on SPC, which lacks statistical significance.

Second, the data in the FDC control chart do not follow a normal distribution. The normal distribution is a commonly used model in statistics. However, the data of the FDC control chart is not suitable for analysis in a normal distribution manner. FIG. 1B (prior art) shows the standard deviation of the known FDC control chart normal distribution, which is not applicable to non-normally distributed data, as it can easily cause false alarms, as indicated by the dashed box in FIG. 1B. In FIGS. 1A to 1B, the x-axis is, for example, the sensing cycle, and the y-axis is, for example, the sensing data.

In addition, the FDC control chart will have different data representations depending on parameter characteristics. This means that different parameters have different data characteristics, and a single computational logic cannot cover all scenarios.

In conclusion, the current FDC control chart control line calculation is not based on statistical analysis, the data does not follow a normal distribution, and different parameter data representations need to be considered. These limitations need to be improved when using the FDC control chart.

Therefore, the application proposes a method for generating the control line of the FDC control chart and develops various computational logics based on parameter characteristics to obtain a reasonable FDC control line.

SUMMARY

According to one embodiment, provided is a manufacturing control method applied to a computer system comprising a processor, a storage device and a display device, the manufacturing control method comprising the following steps: based on a clustering reference value, dividing a plurality of data after outlier-filtering into a plurality of data subgroups, where the data are read out from the storage device by the processor; calculating a plurality of standard deviations of the data subgroups, respectively; calculating a warning line upper limit and a warning line lower limit of a warning line based on the clustering reference value, a predetermined multiple, and the standard deviations; adjusting one of the warning line upper limit and the warning line lower limit based on the predetermined multiple and the standard deviations, and the warning line upper limit and the warning line lower limit are displayed on the display device by the processor; and when a sensing data exceeds the warning line upper limit or the warning line lower limit, triggering a warning signal by the computer system.

According to another embodiment, provided is a manufacturing control method applied to a computer system comprising a processor, a storage device, and a display device, the manufacturing control method comprising the following steps: obtaining a plurality of primary parameter data and a plurality of secondary parameter data from a plurality of machines of the same type, where the primary parameter data and the secondary parameter data are read by the processor from the storage device; generating a primary parameter specification width from the primary parameter data; for the secondary parameter data from each of the machines, generating a plurality of first individual secondary parameter specification widths corresponding to each of the machines; integrating the secondary parameter data of the machines into a total secondary parameter data; generating a total secondary parameter data specification width for the total secondary parameter data; based on the first individual secondary parameter specification widths and the total secondary parameter data specification width, generating a plurality of second individual secondary parameter specification widths corresponding to each of the machines; generating a primary parameter control chart warning line based on the primary parameter specification width, and generating a plurality of secondary parameter control chart warning lines for the machines based on the second individual secondary parameter specification widths, where the primary parameter control chart warning line and the secondary parameter control chart warning lines are displayed on the display device by the processor; and for a sensed data received by the computer system, the computer system deciding whether to issue a warning signal based on the primary parameter control chart warning line and the secondary parameter control chart warning lines.

According to an alternative embodiment, provided is a non-transitory computer-readable medium, when read by a computer, the computer executing the above manufacturing control method.

Figure 1A:
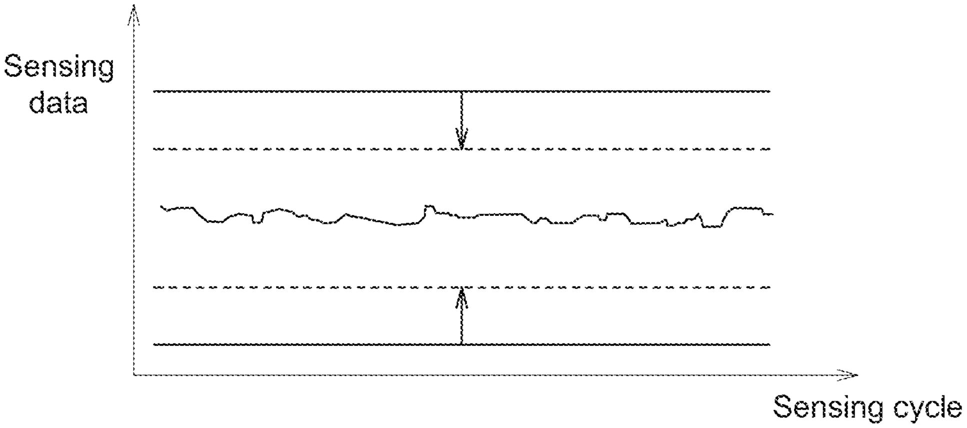
FIG. 1A (prior art)
FIG. 1A (prior art) shows the warning line of the FDC control chart obtained by contracting based on SPC.
Figure 1B:
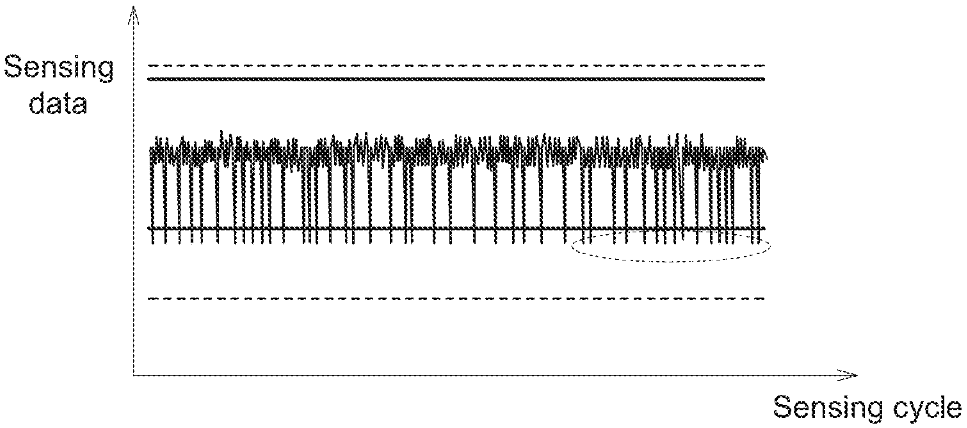
FIG. 1B (prior art)
FIG. 1B (prior art) shows the standard deviation of the known FDC control chart normal distribution.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

Figure 2:
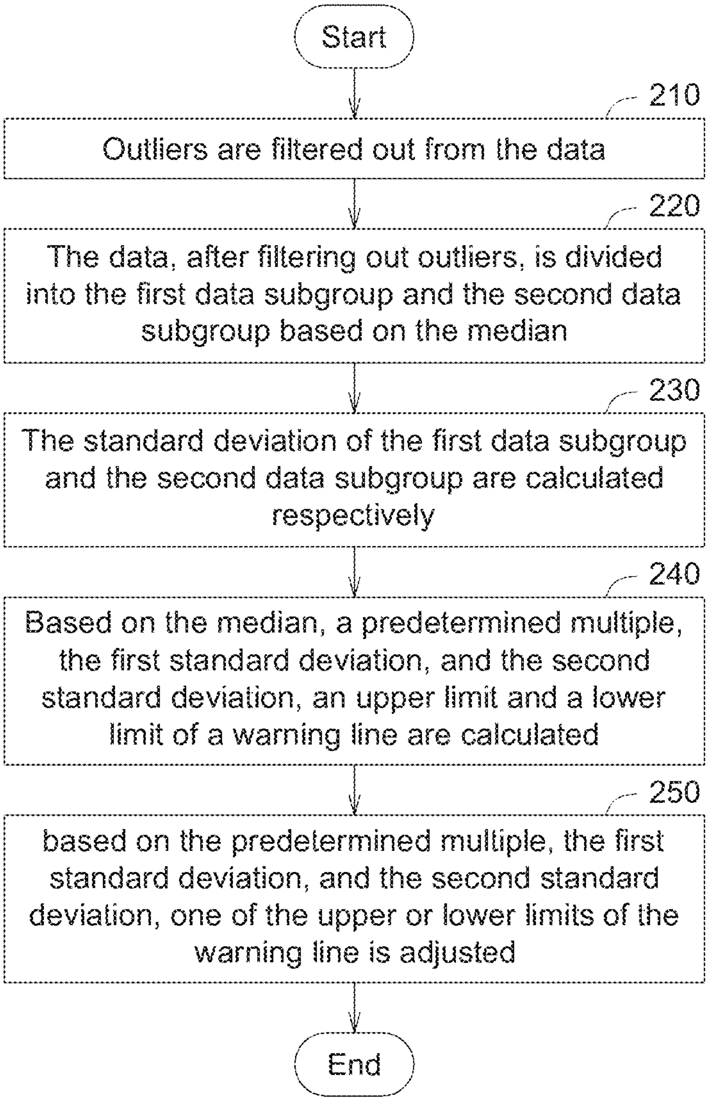
FIG. 2 illustrates a flowchart of a method for generating warning lines of a Fault Detection Classification (FDC) control chart according to an embodiment of the application.

FIG. 2 illustrates a flowchart of a method for generating warning lines of a Fault Detection Classification (FDC) control chart according to an embodiment of the application.

In step 210, outliers are filtered out from the data. Step 210, for example, but not limited to, can use Lenth's algorithm. The specifics of the Lenth's algorithm are not particularly defined here. The data is read by a processor from a storage device.

In step 220, the data, after filtering out outliers, is divided into two groups. For instance, but not limited to, the data is divided into two groups based on the median, referred to as the first data subgroup and the second data subgroup. Below, the median can also be referred to as the clustering reference value.

In step 230, the standard deviation of the first data subgroup and the second data subgroup are calculated respectively.

In step 240, based on the median, a predetermined multiple, the first standard deviation, and the second standard deviation, an upper limit and a lower limit of a warning line are calculated. The upper limit of the warning line is calculated based on the median, the predetermined multiple, and the first standard deviation; and the lower limit is calculated based on the median, the predetermined multiple, and the second standard deviation.

In step 250, based on the predetermined multiple, the first standard deviation, and the second standard deviation, one of the upper or lower limits of the warning line is adjusted to obtain a statistically significant warning line. The width between the upper and lower limits of the warning line is called the "specification width". The adjusted upper or lower limit is closer to the median. When a sensed data exceeds the upper or lower limit of the warning line, a warning signal is issued. The method for generating warning lines of the FDC control chart in FIG. 2 can also be referred to as a manufacturing control method.

Figure 3A:
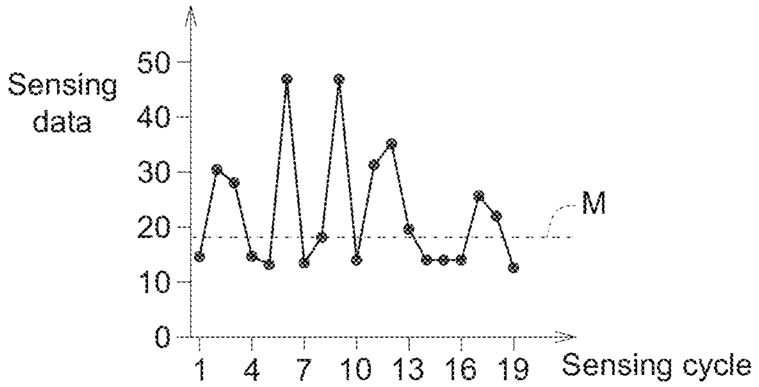
FIGS. 3A to 3F show an actual example of generating a warning line according to an embodiment of the application.

Please refer to FIGS. 3A to 3F, which show an actual example of generating a warning line according to an embodiment of the application. In FIGS. 3A to 3F, the x-axis represents the sensing cycle, and the y-axis represents the sensed data. In FIG. 3A, the data used has already had outliers filtered out. In FIG. 3A, the median M of the data is calculated.

Figure 3B:
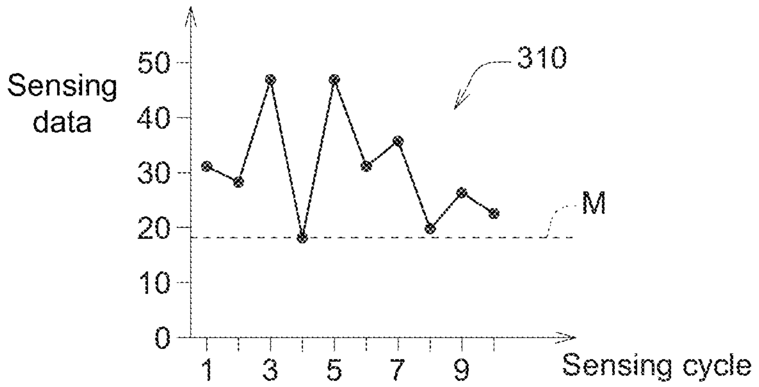

In FIG. 3B, based on the median M, the data is divided into the first data subgroup 310 and the second data subgroup (not shown). The first data subgroup 310 includes data greater than the median M, while the second data subgroup (not shown) includes data less than the median M.

Figure 3C:
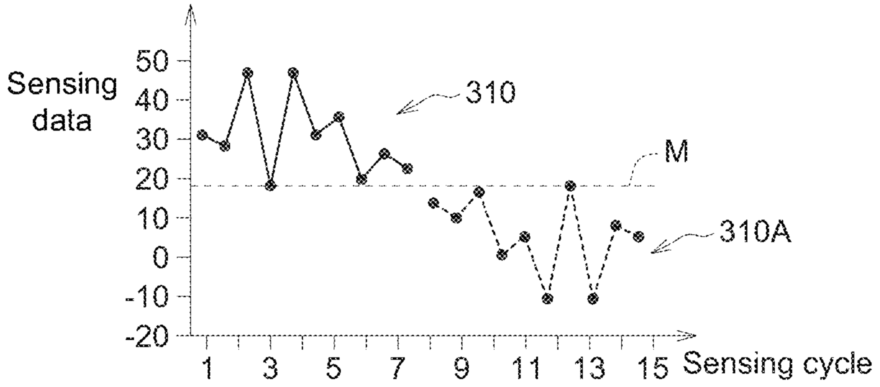

In FIG. 3C, based on the median M, the first data subgroup and the second data subgroup are mirrored. For example, based on the median M, the first data subgroup 310 is mirrored to form the first mirrored data subgroup 310A. Additionally, based on the median M, the second data subgroup (not shown) is mirrored to form the second mirrored data subgroup (not shown).

Figure 3D:
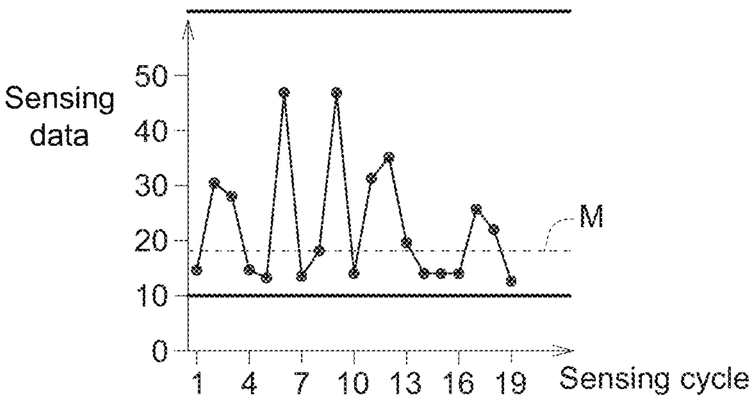

In FIG. 3D, the first standard deviation σ1 is calculated for the first data subgroup 310 and the first mirrored data subgroup; and the second standard deviation σ2 is calculated for the second data subgroup and the second mirrored data subgroup. Here, the specifics of calculating the standard deviation are not particularly defined.

Figure 3E:
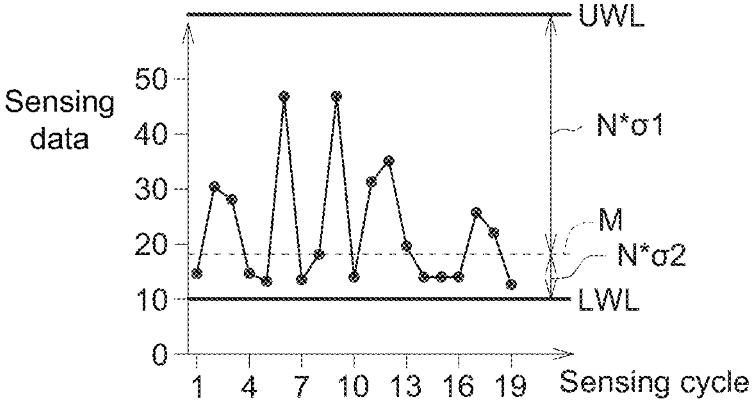

In FIG. 3E, based on the median M, a specified multiple N, the first standard deviation σ1, and the second standard deviation σ2, the upper warning line limit UWL and the lower warning line limit LWL are calculated. For instance, but not limited to, $UWL=M+N\sigma1$; and $LWL=M-N\sigma2$.

Figure 3F:
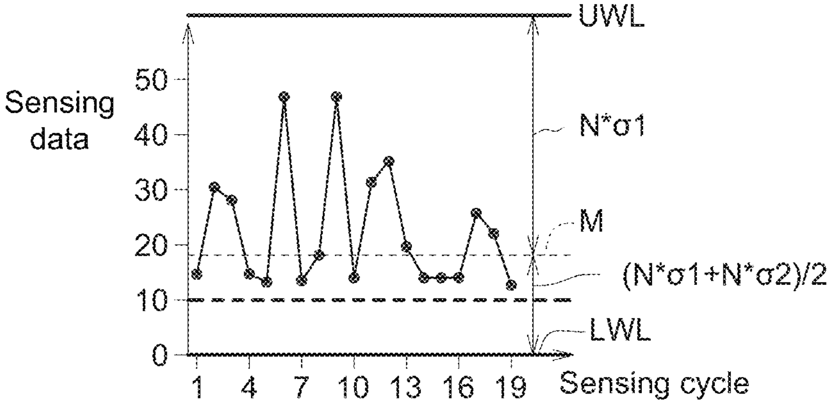

In FIG. 3F, the narrower side is widened. Here, the "narrower side" refers to the one among the upper and lower warning line limits that is closer to the median M. Or, the "narrower side" refers to the interval corresponding to the smaller of Nσ1 and Nσ2. In practice, for example, but not limited to, as seen in FIG. 3E, the "narrower side" refers to the interval corresponding to Nσ2, because σ1>σ2. Therefore, the lower warning line limit is adjusted: $LWL=M-(N\sigma1+N*\sigma2)/2$. By this, in this embodiment, a statistically significant warning line can be obtained.

The above describes obtaining a warning line for an FDC control chart of a parameter in one embodiment. Now, another embodiment will be described on how to obtain warning lines for an FDC control chart with multiple parameters.

Figure 4A:
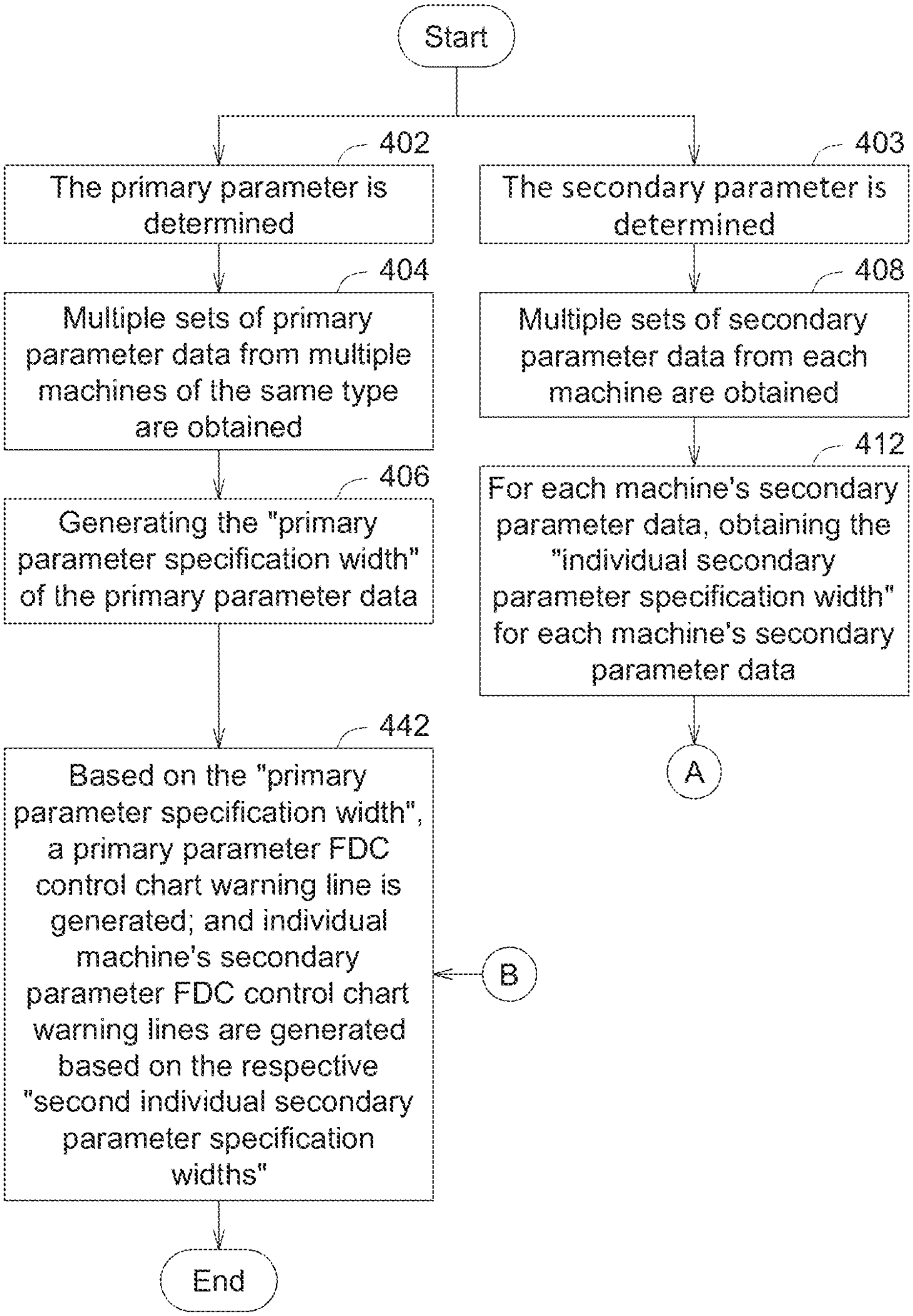
FIGS. 4A and 4B show flowcharts of a method for generating warning lines of a multi-parameter fault detection classification control chart according to an embodiment.
Figure 4B:
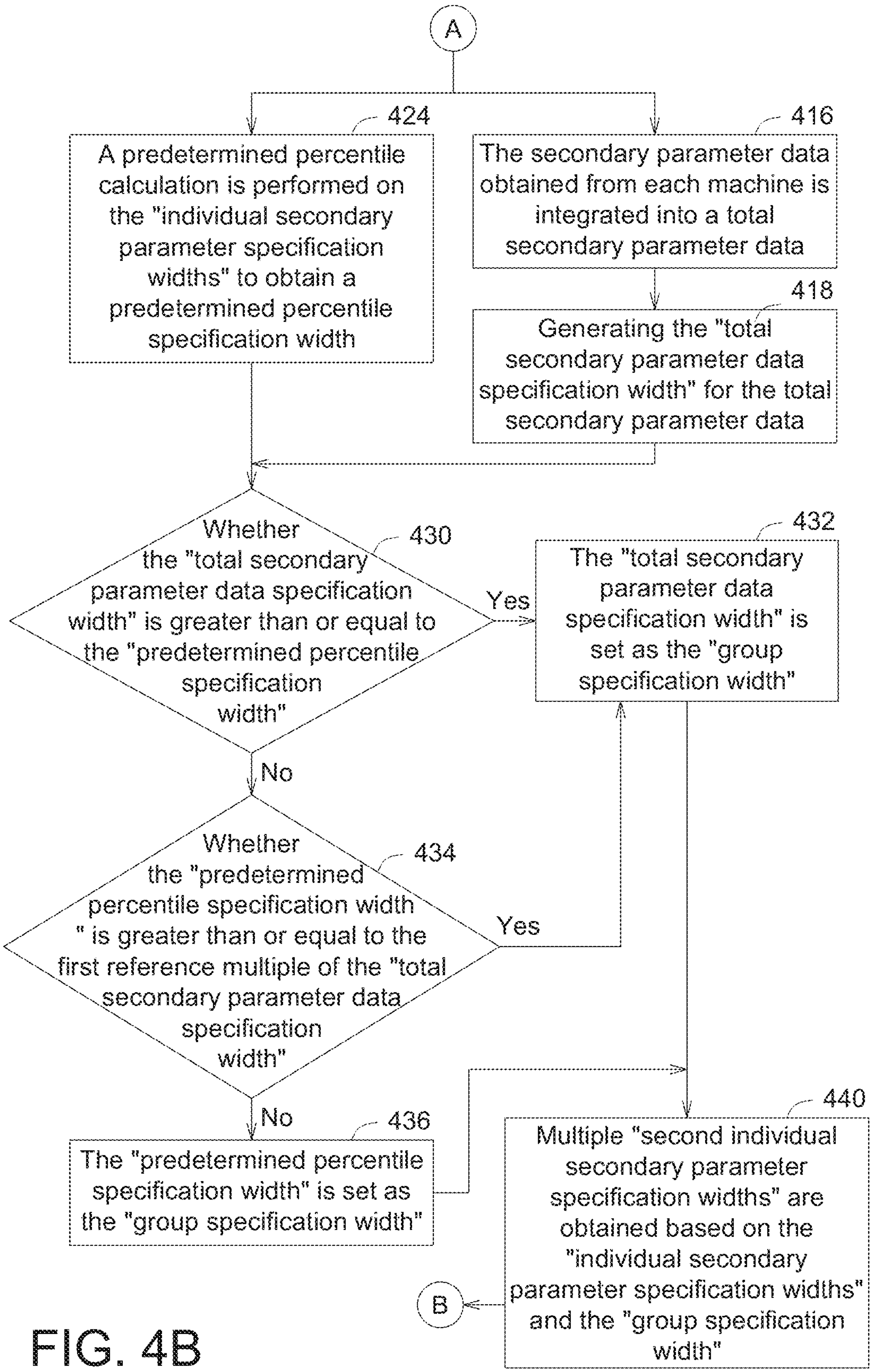

FIGS. 4A and 4B show flowcharts of a method for generating warning lines of a multi-parameter fault detection classification control chart according to an embodiment. Below, an example with 10 machines is given for illustration, but it is understood that the application is not limited to this.

In step 402, the primary parameter is determined. In step 403, the secondary parameter is determined. Here, for example, but not limited to, the primary parameter refers to the temperature parameter of the manufacturing machine, while the secondary parameter refers to the pressure parameter of the manufacturing machine.

In step 404, multiple sets of primary parameter data from multiple machines of the same type are obtained. For instance, but not limited to, all temperature data from the 10 machines are obtained.

In step 406, the method of FIG. 2 is used to obtain the "specification width" of the primary parameter data from step 404. For distinction, the "specification width" obtained in step 406 is referred to as the "primary parameter specification width".

In step 408, multiple sets of secondary parameter data from each machine are obtained. That is, individual pressure data from the 10 machines are obtained. For ease of explanation, it is assumed here that each machine has 10 sets of pressure data.

In step 412, for each machine's secondary parameter data, the method from FIG. 2 is used individually to obtain the "specification width" for each machine's secondary parameter data. For distinction, the "specification width" obtained in step 412 is referred to as the "individual secondary parameter specification width". For example, but not limited to, using 10 machines as an example, step 412 will obtain the "individual secondary parameter specification width" for these 10 machines (i.e., there are 10 sets of "individual secondary parameter specification width").

In step 416, the secondary parameter data obtained from each machine in step 408 is integrated into a total secondary parameter data. That is, all pressure data from the 10 machines are integrated into the total secondary parameter data. For ease of explanation, assuming each machine has 10 sets of pressure data, after integration, a total of 100 sets of pressure data can be obtained.

In step 418, the method from FIG. 2 is used to obtain the "specification width" for the total secondary parameter data. For distinction, the "specification width" obtained in step 418 is referred to as the "total secondary parameter data specification width". For example, using the 100 sets of pressure data from the 10 machines, step 418 will apply the method from FIG. 2 to obtain the "total secondary parameter data specification width".

In step 424, a predetermined percentile calculation is performed on the "individual secondary parameter specification widths" obtained in step 412 to obtain a predetermined percentile specification width. For example, but not limited to, the "predetermined percentile calculation" obtains the 75th percentile from the "individual secondary parameter specification widths", resulting in the "75th percentile specification width".

In step 430, it is determined whether the "total secondary parameter data specification width" is greater than or equal to the "predetermined percentile specification width".

If step 430 is affirmative, then in step 432, the "total secondary parameter data specification width" is set as the "group specification width".

If step 430 is negative, then in step 434, it is checked whether the "predetermined percentile specification width" is greater than or equal to the first reference multiple (for example, but not limited to, the reference multiple being 3 times) of the "total secondary parameter data specification width".

If step 434 is affirmative, the process proceeds to step 432, where the "total secondary parameter data specification width" is set as the "group specification width".

If step 434 is negative, the process proceeds to step 436, where the "predetermined percentile specification width" is set as the "group specification width".

In step 440, multiple "second individual secondary parameter specification widths" are obtained based on the "individual secondary parameter specification widths" and the "group specification width". For the given example, there are currently 10 sets of "individual secondary parameter specification widths". When the first set of "individual secondary parameter specification width" is greater than or equal to the second reference multiple (e.g., 1.5 times, which can be adjusted as needed and is used here for illustrative purposes) of the "group specification width", 1.5 times the "group specification width" is set as the first "second individual secondary parameter specification width". And, when the first "individual secondary parameter specification width" is less than 1.5 times the "group specification width", the larger value between the first "individual secondary parameter specification width" and the "group specification width" is set as the first "second individual secondary parameter specification width". This process is repeated until all "second individual secondary parameter specification widths" are obtained.

In step 442, based on the "primary parameter specification width" (obtained in step 406), a primary parameter FDC control chart warning line is generated (shared by the 10 machines). Additionally, individual machine's secondary parameter FDC control chart warning lines are generated based on the respective "second individual secondary parameter specification widths". For instance, since there are 10 machines, for the first machine, the first "second individual secondary parameter specification width" generated in step 440 is used to produce the secondary parameter FDC control chart warning line for the first machine. For the second machine, the second "second individual secondary parameter specification width" from step 440 is used to produce its secondary parameter FDC control chart warning line, and so on for the rest.

For a received sensing data, based on the primary parameter FDC control chart warning line and the secondary parameter FDC control chart warning lines, it is determined whether to issue a warning signal. The warning line generation method of the defect detection classification control chart in FIGS. 4A and 4B can also be referred to as a manufacturing control method.

Figure 5:
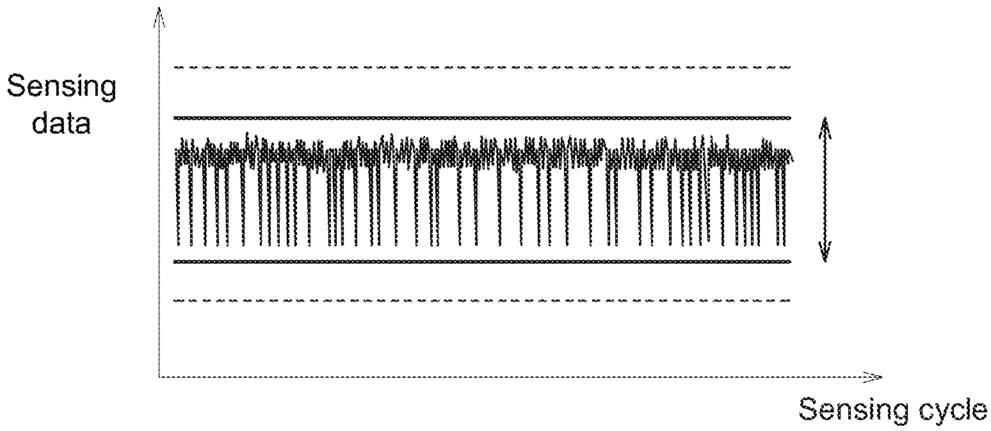
FIG. 5 shows that, according to an embodiment of the application, the FDC control chart and warning line can enhance narrow edge defense and reduce wide edge false alarms.

FIG. 5 shows that, according to an embodiment of the application, the FDC control chart and warning line can enhance narrow edge defense and reduce wide edge false alarms. In FIG. 5, the x-axis represents the sensing cycle, and the y-axis represents the sensing data.

Figure 6:
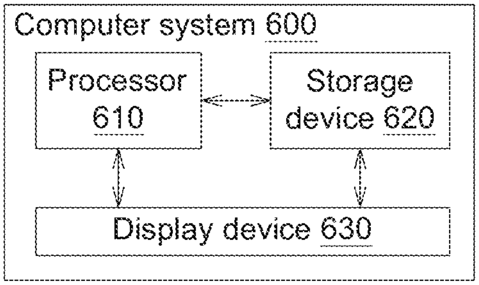
FIG. 6 shows a functional block diagram of a computer system according to an embodiment of the application.

FIG. 6 shows a functional block diagram of a computer system according to an embodiment of the application. The computer system 600 of this embodiment includes a processor 610, a storage device 620, and a display device 630. The processor 610 is coupled to the storage device 620 (e.g., hard drive, SSD, etc.) and the display device 630 (e.g., LCD screen). The data from FIGS. 2, 4A, and 4B (such as primary parameter data, secondary parameter data, etc.) can be stored in the storage device 620. The processor 610 reads this data from the storage device 620 and performs the method flow of FIGS. 2, 4A, and 4B to produce one or more FDC control charts with one or more warning lines. Subsequently, this data, the FDC control charts, and the warning lines are displayed on the display device 630.

In this embodiment, machines may have sensors, such as temperature sensors, pressure sensors, etc. The machine can be wired or wirelessly connected to the computer system 600. The computer system 600 can execute the methods from FIGS. 2 and/or 4 to generate control chart warning lines. When the sensing data from the machine exceeds the warning line upper limit and/or lower limit, the computer system 600 can issue a warning signal, alerting the operator to changes in the process.

In this embodiment, through the method flow of FIGS. 4A and 4B, data diversity can be expanded, introducing more different types of data, making data distribution more diverse.

In this embodiment, through the method flow of FIGS. 2, 4A, and 4B, false alarms from the wide edge (i.e., wider tail) when processing non-normal distribution data can be reduced.

In this embodiment, through the method flow of FIGS. 2, 4A, and 4B, the situation where the narrow edge (i.e., narrower tail) standard deviation is too narrow when processing non-normal distribution data can be avoided. In statistics, a too narrow standard deviation on the narrow edge might lead to insufficient capture of variability on the narrow edge, thereby reducing the detection capability for variability on the narrow edge. By using the method flow of FIGS. 2, 4A, and 4B in this embodiment, the detection capability for variability on the narrow edge can be enhanced, improving the defense of the narrow edge.

In summary, in this embodiment, data diversity can be expanded, reducing false alarms from the wide edge of non-normal distribution data patterns, while preventing too narrow standard deviation on the narrow edge of non-normal distribution data, enhancing the defense of the narrow edge. These measures help better handle non-normal distribution data.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A manufacturing control method applied to a computer system comprising a processor, a storage device and a display device, the manufacturing control method comprising the following steps:

based on a clustering reference value, dividing a plurality of data after outlier-filtering into a plurality of data subgroups, where the data are read out from the storage device by the processor;

calculating a plurality of standard deviations of the data subgroups, respectively a first standard deviation of a first data subgroup and a first mirrored data subgroup;

calculating a second standard deviation of a second data subgroup and a second mirrored data subgroup;

calculating a warning line upper limit and a warning line lower limit of a warning line based on the clustering reference value, a predetermined multiple, and the standard deviations;

adjusting one of the warning line upper limit and the warning line lower limit based on the predetermined multiple and the standard deviations, and the warning line upper limit and the warning line lower limit are displayed on the display device by the processor; and when a sensing data exceeds the warning line upper limit or the warning line lower limit, triggering a warning signal by the computer system.

2. The manufacturing control method according to claim 1, wherein:

the clustering reference value is a median of the data;

based on the clustering reference value of the data, the data are divided into the first data subgroup and the second data subgroup, the first data subgroup includes data greater than the clustering reference value, and the second data subgroup includes data less than the clustering reference value; and based on the clustering reference value, the first data subgroup is mirrored to form the first mirrored data subgroup, and based on the clustering reference value, the second data subgroup is mirrored to form the second mirrored data subgroup.

3. The manufacturing control method according to claim 1, wherein the warning line upper limit is calculated based on the clustering reference value, the predetermined multiple, and the first standard deviation; and the warning line lower limit is calculated based on the clustering reference value, the predetermined multiple, and the second standard deviation.

4. The manufacturing control method according to claim 1, wherein the warning line upper limit or the warning line lower limit which is closer to the clustering reference value is adjusted.

5. A manufacturing control method applied to a computer system comprising a processor, a storage device, and a display device, the manufacturing control method comprising the following steps:

obtaining a plurality of primary parameter data and a plurality of secondary parameter data from a plurality of machines of the same type, where the primary parameter data and the secondary parameter data are read by the processor from the storage device;

generating a primary parameter specification width from the primary parameter data;

for the secondary parameter data from each of the machines, generating a plurality of first individual secondary parameter specification widths corresponding to each of the machines;

integrating the secondary parameter data of the machines into a total secondary parameter data;

generating a total secondary parameter data specification width for the total secondary parameter data;

based on the first individual secondary parameter specification widths and the total secondary parameter data specification width, generating a plurality of second individual secondary parameter specification widths corresponding to each of the machines;

generating a primary parameter control chart warning line based on the primary parameter specification width, and generating a plurality of secondary parameter control chart warning lines for the machines based on the second individual secondary parameter specification widths, where the primary parameter control chart warning line and the secondary parameter control chart warning lines are displayed on the display device by the processor; and for a sensed data received by the computer system, the computer system deciding whether to issue a warning signal based on the primary parameter control chart warning line and the secondary parameter control chart warning lines.

6. The manufacturing control method according to claim 5, wherein the step of generating the second individual secondary parameter specification widths includes the following steps:

performing a predetermined percentile operation on the first individual secondary parameter specification widths to obtain a predetermined percentile specification width;

when the total secondary parameter data specification width is greater than or equal to the predetermined percentile specification width, setting the total secondary parameter data specification width as a group specification width;

when the total secondary parameter data specification width is less than the predetermined percentile specification width, checking whether the predetermined percentile specification width is greater than or equal to a first reference multiple of the total secondary parameter data specification width;

when the predetermined percentile specification width is greater than or equal to the first reference multiple of the total secondary parameter data specification width, setting the total secondary parameter data specification width as the group specification width;

when the predetermined percentile specification width is less than the first reference multiple of the total secondary parameter data specification width, setting the predetermined percentile specification width as the group specification width; and generating the second individual secondary parameter specification widths based on the first individual secondary parameter specification widths and the group specification width.

7. The manufacturing control method according to claim 6, wherein the step of generating the second individual secondary parameter specification widths includes the following steps:

when the first individual secondary parameter specification width is greater than or equal to a second reference multiple of the group specification width, setting the second reference multiple of the group specification width as the second individual secondary parameter specification width; and when the first individual secondary parameter specification width is less than the second reference multiple of the group specification width, setting a maximum value between the first individual secondary parameter specification width and the group specification width as the second individual secondary parameter specification width.

8. The manufacturing control method according to claim 6, wherein the step of performing the predetermined percentile operation on the first individual secondary parameter specification widths to generate the predetermined percentile specification width includes:

generating a 75th percentile specification width from the first individual secondary parameter specification widths.

9. A non-transitory computer-readable medium, when read by a computer, the computer executing the manufacturing control method according to claim 1.

10. A non-transitory computer-readable medium, when read by a computer, the computer executing the manufacturing control method according to claim 5.

* * * * *